US012792780B2

(12) United States Patent
Pundak et al.

(10) Patent No.: US 12,792,780 B2
(45) Date of Patent: Nov. 10, 2026

(54) DETECTING GENERATIVE MACHINE LEARNING MODEL CONTENT

(71) Applicant: Microsoft Technology Licensing, LLC, Redmond, WA (US)

(72) Inventors: Gilad Pundak, Rehovot (IL); Hanan Grinberg, Ramat Gan (IL); Eran Arbel, Herzeliya (IL); Daniel Spivak, Ness Ziona (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 260 days.

(21) Appl. No.: 18/668,948

(22) Filed: May 20, 2024

(65) Prior Publication Data

US 2025/0356057 A1 Nov. 20, 2025

(51) Int. Cl.

| | |
|---|---|
| ***G06F 21/64*** | (2013.01) |
| ***G06V 40/16*** | (2022.01) |
| ***H04L 9/32*** | (2006.01) |
| ***H04N 7/15*** | (2006.01) |

(52) U.S. Cl.

CPC ............ *G06F 21/64* (2013.01); *G06V 40/172* (2022.01); *H04L 9/3247* (2013.01); *H04N 7/15* (2013.01)

(58) Field of Classification Search

None

See application file for complete search history.

(56) References Cited

U.S. PATENT DOCUMENTS

| | | | | |
|---|---|---|---|---|
| 2014/0280272 | A1* | 9/2014 | Choque | G06F 16/137 707/758 |
| 2018/0276390 | A1* | 9/2018 | Grafi | H04L 9/14 |
| 2020/0175279 | A1* | 6/2020 | Chen | G06V 20/10 |
| 2020/0193621 | A1* | 6/2020 | Yu | G06T 7/75 |
| 2021/0287322 | A1* | 9/2021 | Yaffe | H04L 9/3242 |
| 2023/0116801 | A1* | 4/2023 | Yao | G06V 20/95 382/157 |
| 2023/0299971 | A1* | 9/2023 | Hashimoto | G06F 21/64 713/156 |
| 2023/0360388 | A1* | 11/2023 | Singh | G06F 11/3438 |
| 2025/0023741 | A1* | 1/2025 | Kwatra | H04L 9/3247 |
| 2025/0106039 | A1* | 3/2025 | Wuest | H04L 9/3247 |
| 2025/0300838 | A1* | 9/2025 | Völcker | H04L 9/3247 |

FOREIGN PATENT DOCUMENTS

| | | | | |
|---|---|---|---|---|
| CN | 115862172 A | * | 3/2023 | |
| KR | 102616571 B1 | * | 12/2023 | G06Q 50/30 |
| WO | WO-2010021966 A1 | * | 2/2010 | H04N 21/43072 |

* cited by examiner

*Primary Examiner* — Ali H. Cheema

(74) *Attorney, Agent, or Firm* — Shook, Hardy & Bacon L.L.P.

(57) ABSTRACT

Various embodiments of the technology described herein relate to distribution-verified and authenticated content, including obtaining content and authentication data from a user device, authenticating the content based on the authentication data, and distributing the content, including an indication that the content has been verified and/or authenticated. For example, an entity depicted in the content is verified, and data depicting the entity (e.g., video and/or audio) is authenticated and distributed to various user devices.

20 Claims, 12 Drawing Sheets

DETECTING GENERATIVE MACHINE LEARNING MODEL CONTENT

BACKGROUND

Generative artificial intelligence (AI) models (e.g., Large Language Models or "LLMs," Diffusion models, Generative Adversarial Networks or "GANs," etc.) develop quickly and demonstrate applicability to a wide range of applications and tasks. For example, generative AI models can provide support for various applications including generating videos and images based on natural language text descriptions. Furthermore, the functionality of generative AI models raises concerns with regard to security for computing environments. For example, generative AI can be used to generate harmful or malicious content, such as deepfake videos and images. These instances highlight the potential for generative AI to be manipulated by malicious actors to disseminate false information, engage in online harassment, or otherwise manipulate users with generated content.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein are related to verifying the realness or authenticity of content, such as audio and video data during distribution of the content to user devices. Real or authentic content contrasts with AI generated content and other fake content. Embodiments of the technology described herein leverage secure execution environments (e.g., various combinations of physical and virtual secure memory and processors) to verify and/or sign real content (e.g., user-generated content) to enable applications to differentiate from content including "real" data and generative AI content (e.g., "deepfake" data).

In an illustrative example, a user device (e.g., a client device such as a laptop or mobile phone) captures raw sensor data which is verified and signed. In addition, in this example, the sensor data can be used by an application to generate manipulated data (e.g., adding a filter to video data). Continuing this example, the raw sensor data, including the signature, and the manipulated data are transmitted to a computing resource service provider for verification and distribution. In an embodiment, the user device executes a video conferencing application that captures sensor data and manipulates the sensor data (e.g., noise cancelation, video filters, virtual backgrounds, etc.) prior to transmitting to a server for distribution. In addition, in such embodiments, the user device includes a secure environment (e.g., Trusted Execution Environment [TEE], secure hardware, Direct Rendering Engine [DRE], Enhanced Sign-in Security [ESS], isolated memory area, etc.) that is used to perform verification, authentication, and/or sign sensor data. For example, the secure environment obtains video frames from a camera that performs facial recognition to verify the user, extracts the region of interest (e.g., draws a bounding box around the user's face), signs the video frame, and provides the signed video frame to the computing resource service provider.

Continuing this example, the computing resource service provider verifies the signature and compares the video frame obtained from the secure environment to a manipulated video frame obtained from the user device and, if the region of interest in the video frame obtained from the secure environment and the manipulated frame match, the computing resource service provider signs the manipulated frame and distributes the signed manipulated frame to other user devices. In various embodiments, when sensor data is generated or otherwise captured by the user device, a component thereof, such as a secure processor or an application executed by the user device, verifies the sensor data and signs to the sensor data prior to transmission to the computing resource service provider. In such embodiments, applications consuming the sensor data, or other data including the sensor data, verify the content of the sensor data (e.g., by generating a signature of the data and comparing to the signature to a signature transmitted with or otherwise attached to the data) and verify the user device that generated the sensor data. In this manner, data captured by sensors can be differentiated from generated data.

Embodiments of the video conferencing application, or other applications that distribute content (e.g., social media application, messaging application, media distribution application, etc.), cause the secure environment to verify users based on biometrics data maintained by the user device. For example, facial recognition is used to verify that the user depicted in a video frame associated with a video conference and/or meeting is the user associated with the user device executing the video conferencing application and capturing the video frames. Furthermore, in such embodiments, security and mitigation of attacks based on AI-generated content can be extended beyond existing technologies. For example, as a result of the video conferencing application verifying the sensor data and transmitting signed sensor data, applications consuming the sensor data are able to verify content including the sensor data and entities depicted in the sensor data.

BRIEF DESCRIPTION OF THE DRAWINGS

The present disclosure is described in detail below with reference to the attached drawing figures, wherein.

DETAILED DESCRIPTION

Figure 1:
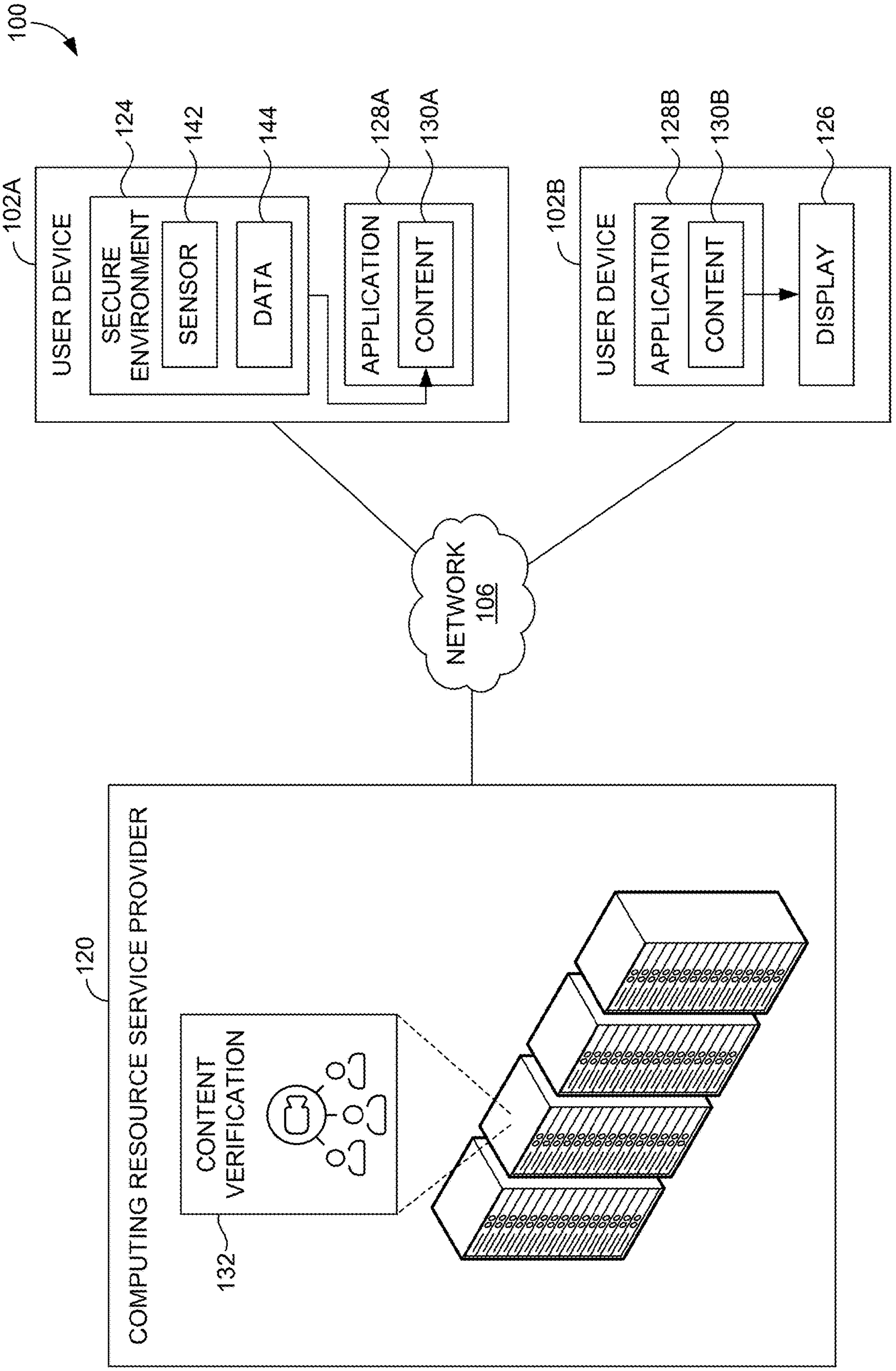
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Various embodiments discussed herein are directed to distributing content to enable users to differentiate verified content from artificial intelligence (AI)-generated content by at least watermarking or providing other indications of verified content. For example, a secure environment (e.g., a Trusted Execution Environment [TEE]) can be used to verify data obtained from a physical sensor, a user device including the physical sensor, and/or a user associated with the user device. In an embodiment, the secure environment (e.g., source code or other executable instructions executed by a secure processor) obtains raw sensor data, verifies an entity depicted in the sensor data, and signs the sensor data prior to transmitting the sensor data to a computing resource service provider. Continuing the example above, the computing resource service provider authenticates the signed sensor data, which includes authentication of the user device (e.g., based on a cryptographic key associated with the user device), and then distributes content including the sensor data to one or more users. In this manner, content including sensor data is authenticated, and users depicted in the content are verified prior to distribution in order to differentiate authentic data from AI-generated data.

In general, detecting AI-generated data requires the content to be watermarked, which is limited by various constraints including the ability to remove watermarks or generate data without watermarks. In addition, the proliferation of AI models and the development of new models makes it difficult to detected AI-generated data. In addition, the number of applications that distribute content and the scope of distributed content create various security risks and expose people to the risk of being misled by AI-generated content. One way to address this issue is by requiring AI-generated content to be properly identified.

However, these identification techniques require the person using the generative AI model to identify the AI-generated content. However, attackers looking to mislead users with AI-generated content are not likely to identify the content as being AI-generated (e.g., “deepfakes”). With this in mind, embodiments discussed herein provide a technical solution to the deficiencies and limitations of existing technologies associated with verifying and authenticating audio and video content. In one embodiment, sensor data is provided to a secure environment that is inaccessible to an application executed by the user device. In such an embodiment, the secure environment signs the sensor data and verifies users depicted in the sensor data prior to transmitting the signed sensor data to the computing resource service provider. In one embodiment, computing resource service provider authenticates the signed sensor data and compares the sensor data to content obtained from the user device. For example, if the user depicted in the sensor data matches the user depicted in the content, the computing resource service provider distributes or otherwise allows the content.

In more detail, a video conferencing application manipulates content (e.g., audio and video captured by sensors of a user device) and provides the manipulated content to a computing resource service provider for distribution to meeting attendees. In one example, video frames are manipulated to add a virtual background or application a filter. However, as described above, it is difficult for the computing resource service provider or meeting attendees (e.g., the video conferencing application executed by user devices operated by the meeting attendees) to differentiate manipulated content from a particular user and content generated by a generative machine learning model. As used herein, a “generative machine learning model” refers to various types and/or combinations of machine learning models (e.g., AI models) that generate data such as text, images, audio, video, or other data based on an input. Example generative machine learning models include LLMs (e.g., GPT-4, LLAMA-2, Bard, etc.) and Diffusion models (e.g., DALL-E 2, Stable Diffusion, and Midjourney). Returning to the example above, the user device, separately from the video conferencing application, provides the computing resource service provider with an attestation of the content. The computing resource service provider can, in this example, authenticate the content prior to distribution to the meeting attendees.

To help illustrate, the user device includes a secure environment that signs data generated by sensors of the user device. In this example, a hash of the sensor data is generated and signed with a cryptographic key assigned to the user device, and a signature that combines the sensor data and the identity of the user device is stored together with the sensor data. In addition, within the secure environment, an identity of the user is verified by at least comparing the sensor data to biometric data (e.g., facial recognition data) stored on the user device. Furthermore, in this example, the sensor data (e.g., video frames) are selected based on an interval of time (e.g., every tenth frame), although, as described in greater detail below, other algorithms can be used for selecting frames of the video to be signed.

Continuing the example, the signed frames and frames from the video conferencing application (e.g., manipulated frames) are provided to the computing resource service provider, which verifies the signature prior to distributing the manipulated frames to other instances of the video conferencing application (e.g., other meeting attendees). For example, the computing resource service provider authenticates the user device (e.g., the user device exists in a list of approved devices), verifies that the frames are signed using the user device's cryptographic key (e.g., verifying that the data and the user device match), and verifies the frames based on the hash (e.g., data attestation).

In various embodiments, content is blocked if the computing resource service provider is unable to verify the user, authenticate the user device, or attest the data (e.g., verify the signature). In other embodiments, if any of the above fails, the computing resource service provider can distribute the content with an indication that the content is unverified, as opposed to blocking the content. Furthermore, the systems and methods described can be used in connection with other applications such as messaging applications, social media applications, news applications, content sharing applications, security surveillance applications, or any other application where sensor data is collected and distributed a with or without manipulation to other devices.

Furthermore, in an embodiment, the secure environment includes a physical connection to the sensor collecting the data. For example, the secure environment includes a secure processor (e.g., a crypto processor) which includes a general-purpose input/output (GPIO) connection to the sensor. In other embodiments, where the physical connection to the sensor is unavailable, sensor data is stored in an area of memory inaccessible to other applications executed by the user device. For example, a TrustZone, Direct Rendering Engine (DRE), Enhanced Sign-in Security (ESS), Virtual Secure Mode (VSM), or other isolation technique is used to store sensor data during verification and sign-in order to prevent manipulation and/or attacks.

Whereas certain existing technologies allow for watermarking or otherwise indicating that content is generated by a generative AI, these watermarks can be removed—making it difficult to determine that the content is AI-generated. In addition, attackers may develop generative AI models that do not watermark or otherwise indicate that the content was generated by an AI.

The present disclosure provides one or more technical solutions that have technical effects in light of various technical problems. For example, particular embodiments have the technical effect of improving security and authenticity of distributed content such as audio and video recordings distributed via social media applications and video conferencing applications. Instead of attempting to include information such as a watermark indicating that the content is AI-generated, sensor data is verified and signed to allow the sensor data to be authenticated and users to be verified. Accordingly, one technical solution is the use of the secure environment to verify and sign sensor data prior to distribution. Accordingly, this enables manipulated sensor data to still be verified and authenticated. For example, the computing resource service provider or other application consuming the sensor data can verify the signed sensor data and block any data that is not verified.

Particular embodiments have the technical effect of improved security and authentication of distributed content. This is because various embodiments implement the technical solutions of using a secure environment within the user device to attest (e.g., sign) sensor data, which can be used at a computing resource service provider or other endpoint to authenticate content (e.g., determine that the data captured by the sensor matches the data transmitted by the application distributing the content). Content distribution applications are often susceptible to various types of attacks using content generated by generative machine learning models (e.g., "deepfake" attacks). In addition, attackers may attempt to avoid detection and be unwilling to identify content as being generated by a machine learning model. One significantly more efficient alternative is enabling content generated by physical sensors to be verifiable and/or watermarked as "real" content.

Turning to FIG. 1, FIG. 1 is a diagram of an operating environment 100 in which one or more embodiments of the present disclosure can be implemented. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory, as further described with reference to FIG. 11.

It should be understood that operating environment 100 shown in FIG. 1 is an example of one suitable operating environment. Among other components not shown, operating environment 100 includes a first user device 102A including a secure environment 124, a second user device 102B, a computing resource service provider 120, and a network 106. Each of the components shown in FIG. 1 can be implemented via any type of computing device, such as one or more computing devices 1100 described in connection with FIG. 11, for example. These components can communicate with each other via network 106, which can be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 106 is not described in significant detail.

It should be understood that any number of devices, servers, and other components can be employed within operating environment 100 within the scope of the present disclosure. Each can comprise a single device or multiple devices cooperating in a distributed environment. For example, the computing resource service provider 120 includes multiple server computer systems cooperating in a distributed environment to perform the operations described in the present disclosure, such as distributing content 130A and 130B to user devices such as user device 102A and 102B. In an embodiment, the computing resource service provider 120 is provided or otherwise implemented as a content distribution service or other service.

The user device 102A and 102B can be any type of computing device capable of being operated by an entity (e.g., individual or organization) and obtains data from another user device and/or the computing resource service provider 120 (e.g., the content 130A and 130B), which can be facilitated by the computing resource service provider 120. The user device 102A includes a sensor 142 to capture data 144 which, in various embodiments, is used by an application 128A to generate the content 130A. In one example, the application 128A includes a video conferencing application that captures audio and/or video using the sensor 142 and transmits the data 144 as content 130A to the computing resource service provider 120 for distribution to the user device 102B. Furthermore, in various embodiments, the user device 102B has access to or otherwise displays the content 130 using a display 126. In another example, the application 128A and 128B includes a social media application that displays content 130A and 130B generated by one or more users based on data 144 collected by the sensor 142.

In some implementations, the user devices 102A and 102B are the type of computing device described in connection with FIG. 11. By way of example and not limitation, the user devices 102A and 102B can be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices 102A and 102B can include one or more processors and one or more computer-readable media. The computer-readable media can also include computer-readable instructions executable by the one or more processors. In an embodiment, the instructions are embodied by one or more applications, such as applications 128A and 128B shown in FIG. 1. Applications 128A and 128B are referred to as a single application for simplicity, but its functionality can be embodied by one or more applications in practice.

In various embodiments, the applications 128A and 128B include any application capable of facilitating the exchange of information between the user devices 102A, 102B, the computing resource service provider 120, and/or combination thereof. For example, the application 128A operates as a user interface to generate content 130A and provides the content 130A to the computing resource service provider 120. In some implementations, the application 128A comprises a web application, which can run in a web browser, and can be hosted at least partially on the server-side of the operating environment 100. In addition, or instead, the application 128A can comprise a dedicated application, such as an application being supported by the user device 102A. In some cases, the application 128A is integrated into the operating system (e.g., as a service). It is therefore contemplated herein that “application” be interpreted broadly. Furthermore, applications 128A and 128B, in various embodiments, are instances of the same application. In other embodiments, the applications 128A and 128B are different applications. In one example, the application 128A is a server-side application and the application 128B is a client-side application.

For cloud-based implementations, for example, the applications 128A and 128B are utilized to interface with the functionality implemented by the computing resource service provider 120. In some embodiments, the components, or portions thereof, of the applications 128A and 128B are implemented on the computing resource service provider 120 or other systems or devices. Thus, it should be appreciated that the applications 128A and 128B, in some embodiments, are provided via multiple devices arranged in a distributed environment that collectively provide the functionality described herein. For example, a video conferencing application is provided by a plurality of devices collectively distributing content 130A and 130B. Additionally, other components not shown can also be included within the distributed environment.

In various embodiments, the computing resource service provider 120 includes a plurality of computing devices that provide a multitenant environment in which computing devices (e.g., operated by users) are provided access to computing resources of the computing resource service provider 120. In one example, the computing devices operated by the computing resource service provider 120 include the type of computing device described in connection with FIG. 11. In other examples, the computing devices operated by the computing resource service provider 120 include the type of cloud computing architecture described in connection with FIG. 12. Furthermore, in an embodiment, the computing resource service provider 120 provides a plurality of services that can be used to access the computing resources (e.g., server computer systems, network devices, storage devices, etc.). For example, the services provided by the computing resource service provider 120 include compute services, storage services, video streaming services, networking services, or other services that allow computing devices to access computing resources. In an embodiment, the content 130A and 130B is distributed as a service of the computing resource service provider 120.

As illustrated in FIG. 1, the user device 102A captures data 144 using the sensor 142 and generates content 130A based on the data 144. In an embodiment, the secure environment 124 is used to generate a signature of the data 144 to enable the computing resource service provider 120 to perform content verification 132. In one example, the secure environment verifies an identity of a user depicted in a video frame of the data 144 (e.g., by performing object detection, comparing biometric data, or other methods verifying entities) and signs the video frame prior to transmission to the computing resource service provider 120. Continuing this example, the computing resource service provider 120 then verifies the signature (e.g., using a cryptographic key assigned to the user device 102A, secure environment 124, and/or application 128A). Furthermore, in some embodiments, the content verification 132 includes verifying that the user depicted in the content 130A matches the user verified by the secure environment 124.

In an embodiment, the data 144 includes video captured by the sensor 142. Furthermore, although a single sensor 142 is illustrated in FIG. 1, the user device 102A, in various embodiments, includes a plurality of sensors that capture the data 144. For example, the data 144 can include images captured by a camera, infrared sensors, and other sensors. In addition, in some embodiments, the data 144 can include information captured from different types of sensors. In one example, the data includes audio data and image and/or video data captured by a plurality of sensors.

In various embodiments, the data 144 is stored in the secure environment 124 in addition to being provided to the application 128A (e.g., to be manipulated by the application 128A to generate the content 130A). In one example, the video is captured and/or stored in an uncompressed format (e.g., Advanced Video Coding [H.264] or Moving Picture Expert Group-4 [MPEG-4]) within a memory region of the secure environment. Furthermore, in various embodiments, a hash of the data 144 stored in the secure environment 124 is generated and signed with a cryptographic key. For example, various secure hashing algorithms can be used to generate the hash of the data 144 such that the data can be authenticated. In various embodiments, the secure hashing algorithm includes hash-based message authentication code (HMAC), Secure Hash Algorithm (SHA) (e.g., the SHA-2 family such as SHA-224, SHA-256, SHA-384, SHA-512 etc.), one-key message authentication code (OMAC), or any other secure hashing algorithm.

In various embodiments, the secure environment 124 includes hardware, software, and/or a combination thereof that provides isolation from at least the application 128A executing on the user device 102A. For example, the secure environment 124 includes Trusted Execution Environment (TEE), secure hardware, crypto processor, Direct Rendering Engine (DRE), Enhanced Sign-in Security (ESS), isolated memory area, Virtual Secure Mode (VSM), or a combination thereof. In addition, in some embodiments, the secure environment includes a physical connection to the sensor 142. For example, the secure environment 124 includes a general-purpose input/output (GPIO) connected to the sensor 142 to enable the secure environment 124 to obtain the data 144 (e.g., prior to the sensor 142 transmitting the data 144 to an output buffer or other memory accessible to the application 128A and/or other applications of the user device 102A).

In an embodiment, the content 130A is generated by the application 128A based on the data 144. For example, the content 130A includes manipulation, editing, modification, and/or replacement of at least a portion of the data 144. In a particular example, the application 128A applies a filter to video frames and/or audio frames included in data 144.

In various embodiments, the content 130A is streamed or otherwise transmitted over the network 106. For example, streaming the content 130A is the process of transmitting video data over the Internet in real-time or near-real-time, which allows viewers (e.g., a user) to watch the content 130B on the user device 102A (e.g., without downloading the entire content 130A prior to viewing). In an embodiment, the content 130A is streamed from a physical and/or virtual server operated by the computing resource service provider 120 to the user device 102B over the network 106 to deliver audio and video elements using various protocols such as HyperText Transfer Protocol (HTTP), Transmission Control Protocol/Internet Protocol (TCP/IP), and/or HyperText Markup Language (HTML).

In an embodiment, the secure environment 124 and/or source code executing within the secure environment (e.g., executed by a processor within the secure environment 124) verifies, authenticates, and/or attests to the data 144 to enable the computing resource service provider to perform content verification 132 prior to distribution (e.g., streaming) to the user device 102B and/or application 128B. In an embodiment, the secure environment 124 verifies objects depicted within the data 144. In one example, an object detection model (e.g., scale-invariant feature transforms [SIFT], Convolutional Neural Network [CNN], Video Object Detection [VOD], Region-based Convolutional Neural Network [R-CNN], Single-shot Detector [SSD], Detection Transformer [DETR], etc.) is used to detect objects in images (e.g., frames) of the data 144. In particular, in an embodiment, a user of the user device 102A is detected using the object detection model to match the user's face or other biometrics data to an entity depicted in the data. In the example described in connection with FIG. 3, facial recognition is performed to match a user associated with the user device 102A (e.g., secure sign-in using facial recognition) to a user depicted in images captured by the sensor 142.

Continuing this example, the object detection model defines or otherwise identifies a region of interest corresponding to the user's face to enable the computing resource service provider 120 to match the user's face in the content 130 to the expected user (e.g., the user associated with the user device 102A that was verified within the secure environment 124). In various embodiments, the user device 102A generates biometrics data associated with a user (e.g., capturing facial data using a camera) and stores the biometrics data within the secure environment 124 for user in verifying and/or authenticating the user depicted in the sensor data. Furthermore, in an embodiment, the authentication information generated within the secure environment 124 (e.g., the signed data, verification of a user depicted in data 144, region of interest, and/or other information suitable for content verification 132) is provided to the computing resource service provider 120.

In various embodiments, the content verification 132 performed by the computing resource service provider 120 includes a plurality of operations to authenticate and/or verify that the content 130A is generated by the application 128A based on the data 144 and is not malicious (e.g., a "deepfake"). In one example, the computing resource service provider 120 obtains a signed version of the data 144 (e.g., the data 144 and a hash of the data signed with a cryptographic key) and correlates the data 144 to the content 130A. In an embodiment, the computing resource service provider 120 correlates the data 144 to the content 130A by at least determining whether a region of interest of the data 144 matches the content of a region of interest of the content 130A. For example, as described above, the application 128A applies a virtual background to an image and the computing resource service provider 120 determines whether a first region of interest corresponding to the user's face in the data 144 matches a second region of interest in the content corresponding to the user's face in the content 130A (e.g., whether the content 130A and the data 144 depict the same person).

In various embodiments, the content verification 132 includes adding a watermark or other indication that the content 130A has been verified. For example, the content 130B includes the watermark, overlay, metadata or otherwise indicates to a user device 102B that the content 130B has been verified and is not malicious to enable the application 128B to display the content 130B on the display 126. In various embodiments, the content verification 132 includes verification of a plurality of different types of data and/or content including audio, video, images, location data, and/or other data collected by the sensor 142. In one example, signed audio frames and video frames are verified during the content verification 132. In addition, in some embodiments, the content verification 132 includes a cross-check or other operation to verify content between data types. For example, verification of audio frames can include a cross-check to determine whether corresponding video frames have been successfully verified.

Figure 2:
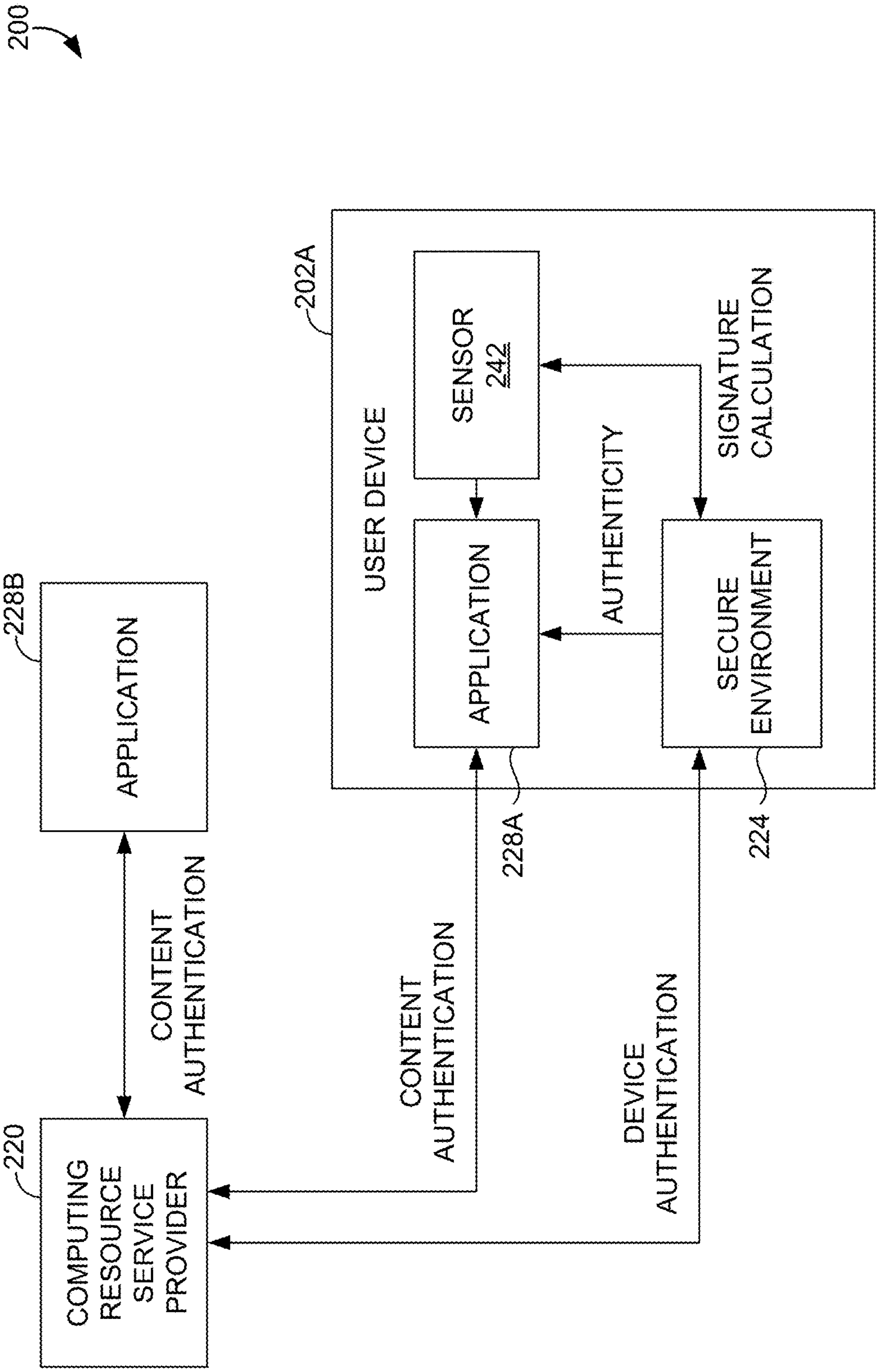
FIG. 2 is a block diagram of an example system including a secure environment used to authenticate data captured by a sensor, in accordance with an embodiment of the present disclosure.

Referring now to FIG. 2, depicted is a block diagram of an example system 200 including a computing resource service provider 220 that distributes verified and/or authenticated content from an application 228A to an application 228B in accordance with an embodiment. The illustrated application 228A uses data from a sensor 242 to generate content. In one example, the application 228A obtains data from the sensor 242 and generates a video to be uploaded to a social media and/or messaging application. The illustrated secure environment 224 includes isolated memory and/or processors to enable authentication of the data collected by the sensor 242.

In some embodiments, the sensor 242 generates or otherwise collects data that is provided to the secure environment, and signatures of the data are generated to enable the computing resource service provider 220 and/or the application 228B. In one example, the sensor 242, prior to or contemporaneously with transmitting data to an output buffer accessible to the application 228A or other application executed by the user device 202A (e.g., an operating system), provides an instance of the data to an isolated memory area within the secure environment 224. Continuing this example, the secure environment 224 generates a signature of the data and provides the data and the signature to the computing resource service provider 220 which compares the content provided by the application 228A with the signature generated within the secure environment 224 to authenticate the content.

In some embodiments, the computing resource service provider 220 authenticates the user device 202A prior to obtaining content from the user device 202A. For example, the application 228A and/or the secure environment 224 authenticates the user device 202A and/or user associated with the user device 202A to the computing resource service provider 220. Various suitable authentication techniques can be used to authenticate the user device 202A in accordance with an embodiment. For example, the secure environment 224 can generate a device signature using a cryptographic key or other cryptographic material assigned to the user device 202A.

In various embodiments, the secure environment 224 includes a plurality of components to perform the various operations to authenticate the data generated by the sensor 242 and/or authenticate the user and/or user device 202A. In one example, the secure environment 224 includes a crypto machine (e.g., Advanced Encryption Standard [AES] or Rivest-Shamir-Adleman [RSA]), a video decoder, a video encoder, an audio decoder, an encoder, a dedicated processor, dedicated memory, or other component to perform the operations to verify and/or authenticate the content, sensor data, user, and/or user device. In an embodiment, the secure environment 224 authenticates the user of the user device 202A. In one example, the secure environment 224 performs facial recognition or other biometric authentication of the user.

In various embodiments, the user device 202A performs data collection using the sensor 242 and the secure environment 224, or other component thereof, and verifies and authenticates the data. Furthermore, in such embodiments, the computing resource service provider 220 authenticates data (e.g., signed sensor data) obtained from the user device 202A. In one example, if the computing resource service provider 220 is unable to authenticate the content obtained from the user device 202A (e.g., signature verification fails, user device authentication fails, and/or user authentication fails), the computing resource service provider does not provide the content to the application 228B. In addition, in some embodiments, the application 228B, in addition or alternatively, authenticates the content obtained from the user device 202A.

Figure 3:
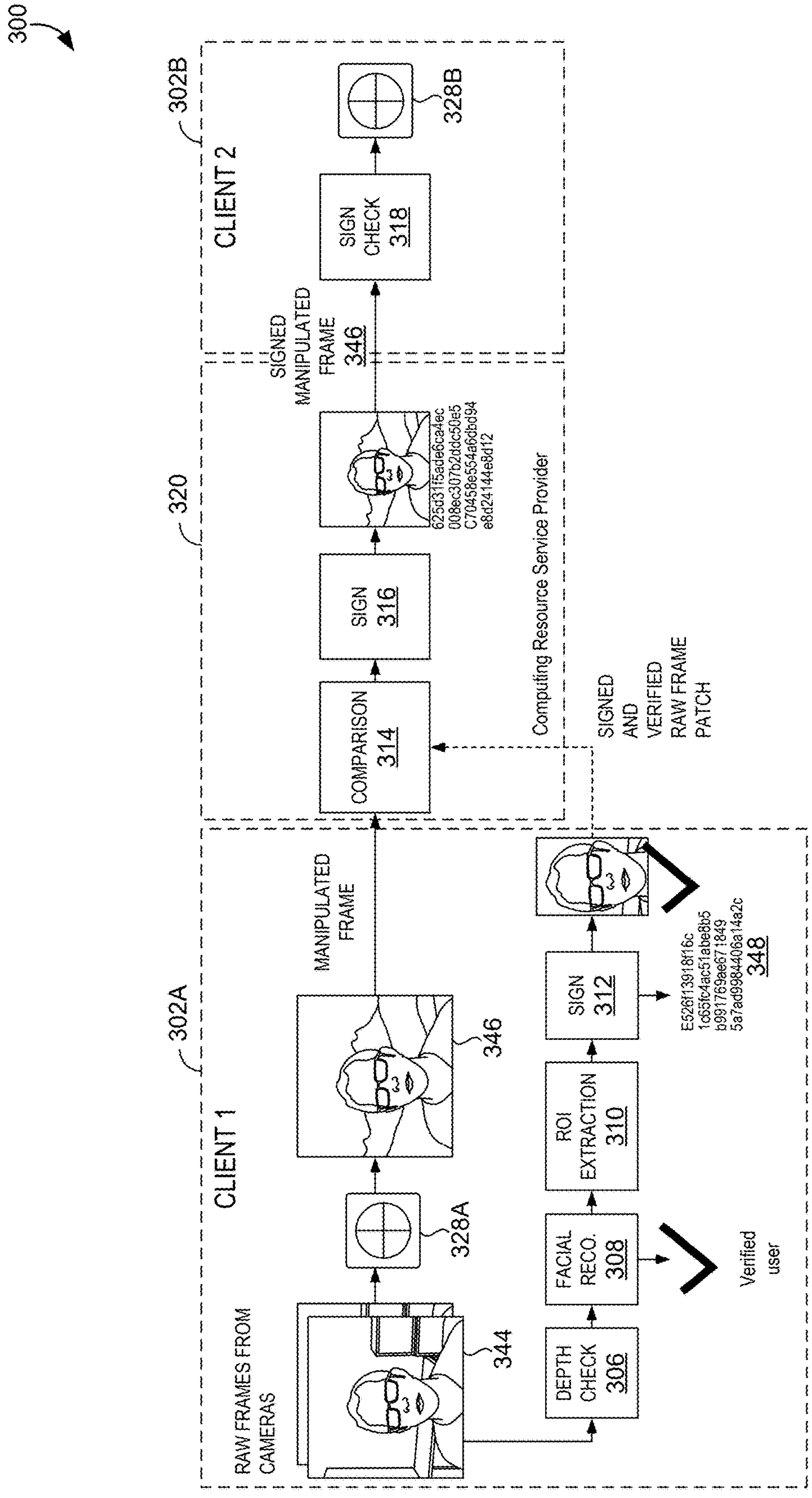
FIG. 3 is a block diagram of an example system for distributing content including signed video frames, in accordance with an embodiment of the present disclosure.

FIG. 3 is a block diagram of an example environment 300 including a computing resource service provider 320 that compares signed and verified frames to manipulated frames 346 from a user device 302A prior to distribution to a user device 302B in accordance with at least one embodiment. In one example, the user devices 302A and 302B are clients (e.g., client 1 and client 2) of a video conferencing application and/or service provided by the computing resource service provider 320. In an embodiment, the user device 302A include a plurality of sensors (e.g., cameras) that capture data from an environment of the user device 302A. In the example illustrated in FIG. 3, the user device 302A includes a plurality of cameras that capture images and/or video as raw frames 344.

In various embodiments, the user device 302 includes a secure environment (not shown in FIG. 3 for simplicity) to verify and sign the raw frames 344. In one example, at least one instance of the raw frames 344, during the operations depicted in FIG. 3, are isolated from the application 328A. In addition, continuing this example, another instance of the raw frames 344 are provided to the application 328A to enable the application 328A to generate the manipulated frames 346. The process of verifying and signing the raw frames 344 and generating the manipulated frames 346, in an embodiment, is performed in parallel. In other embodiments, verifying and signing the raw frames 344 and generation of the manipulated frames 346 are performed in serial.

In various embodiments, the process of verifying and signing the raw frames 344 includes performing a depth check 306 using at least one raw frame. For example, the user device 302A includes an infrared camera, which generates at least one raw frame that is used to perform the depth check 306. In various embodiments, the depth check ensures that the raw frames 344 depict a physical environment with depth and not a flat two-dimensional environment (e.g., using a camera of the user device 302A to record a screen or other display presenting a deepfake video or other content generated by a machine learning model).

In an embodiment, the user device 302A or component thereof (e.g., a processor executing instructions) performs facial recognition 308 to verify a user depicted in the raw frames. In one example, the facial recognition 308 is based on a region of interest (ROI) extracted from the raw frames 344, which is compared biometrics data and/or other facial recognition data maintained by the user device 302A. In an embodiment, a machine learning model trained to perform object detection performs the facial recognition 308 and ROI extraction based on the raw frames 344 as an input. For example, the machine learning model compares the user's face detected in the raw frames 344 to biometrics data associated with the user (e.g., Enhanced Sign-in Security [ESS] where biometrics data such as a face template is stored in a Virtualization Based Security [VBS] and Trusted Platform Module [TPM]) to verify that the user depicted in the raw frames is the user associated with the application 328A and/or user device 302A.

As illustrated in FIG. 3, ROI extraction 310 draws or otherwise generates a bounding box around an ROI in the raw frames 344. For example, a bounding box is drawn around the user's face, as depicted in the raw frames 344. In another example, ROI extraction generates a new image and/or new data that includes the area within the bounding box. In various embodiments, the resulting data (e.g., raw frames 344, including the bounding box or a new image corresponding to the bounding box) is signed 312 to generate a signature 348. In one example, a hash of the data is generated and signed with a private key associated with the user device 302A. Various different methods for generating the signature 348 can be used in accordance with the embodiment illustrated in FIG. 3.

In various embodiments, the signed and verified data (e.g., raw frames 344, facial recognition data, ROI data, and the signature 348) are provided to the computing resource service provider 320. In addition, in some embodiments, the application 328A provides the manipulated frames 346 to the computing resource service provider 320. Based on the signed and verified data and the manipulated frames 346, the computing resource service provider 320, in an embodiment, performs a comparison 314 between the manipulated frames 346 and the signed and verified data. For example, the computing resource service provider uses a machine learning model to determine whether the extracted ROI matches an ROI in the manipulated frames 346. In particular, in such examples, the machine learning model determines whether the user depicted in the manipulated frames matches the user verified during facial recognition 308.

In addition, in various embodiments, the computing resource service provider 320 authenticates the signature 348. If authentication of the signature 348 is successful and the user depicted in the manipulated frame matches the user depicted in the signed and verified data (e.g., the ROI extracted from the raw frames 344), in an embodiment, the computing resource service provider 320 signs 316 the manipulated frames and generates signed manipulated frames 346.

In various embodiments, this process (e.g., depth check 306, facial recognition 308, ROI extraction 310, and signature 312) is performed for every raw frame 344 generated by the user device 302A or a sensor thereof. In other embodiments, this process is performed on a subset of the raw frames 344 (e.g., every 30 frames or every two seconds). Furthermore, in various embodiments, the computing resource service provider 320 provides the signed manipulated frames 346 to additional client devices such as the user device 302B. Once the signed manipulated frames 346 are obtained by the user device 302B, for example, the user device 302B authenticates the signature 318 and, if authentication is successful, provides the signed manipulated frames 346 to the application 328B.

However, in an embodiment, where the comparison fails (e.g., authentication of the signature fails, ROIs fail to generate a match, etc.), the computing resource service provider 320 blocks content transmitted from the user device 302A. In some embodiments where the computing resource service provider 320 blocks unverified and/or unauthenticated content, the user device 302B may not authenticate the signature 318. Furthermore, in some embodiments, the user device 302B performs the same and/or additional verification and authentication operations as the user device 302A and the computing resource service provider 320.

Figure 4:
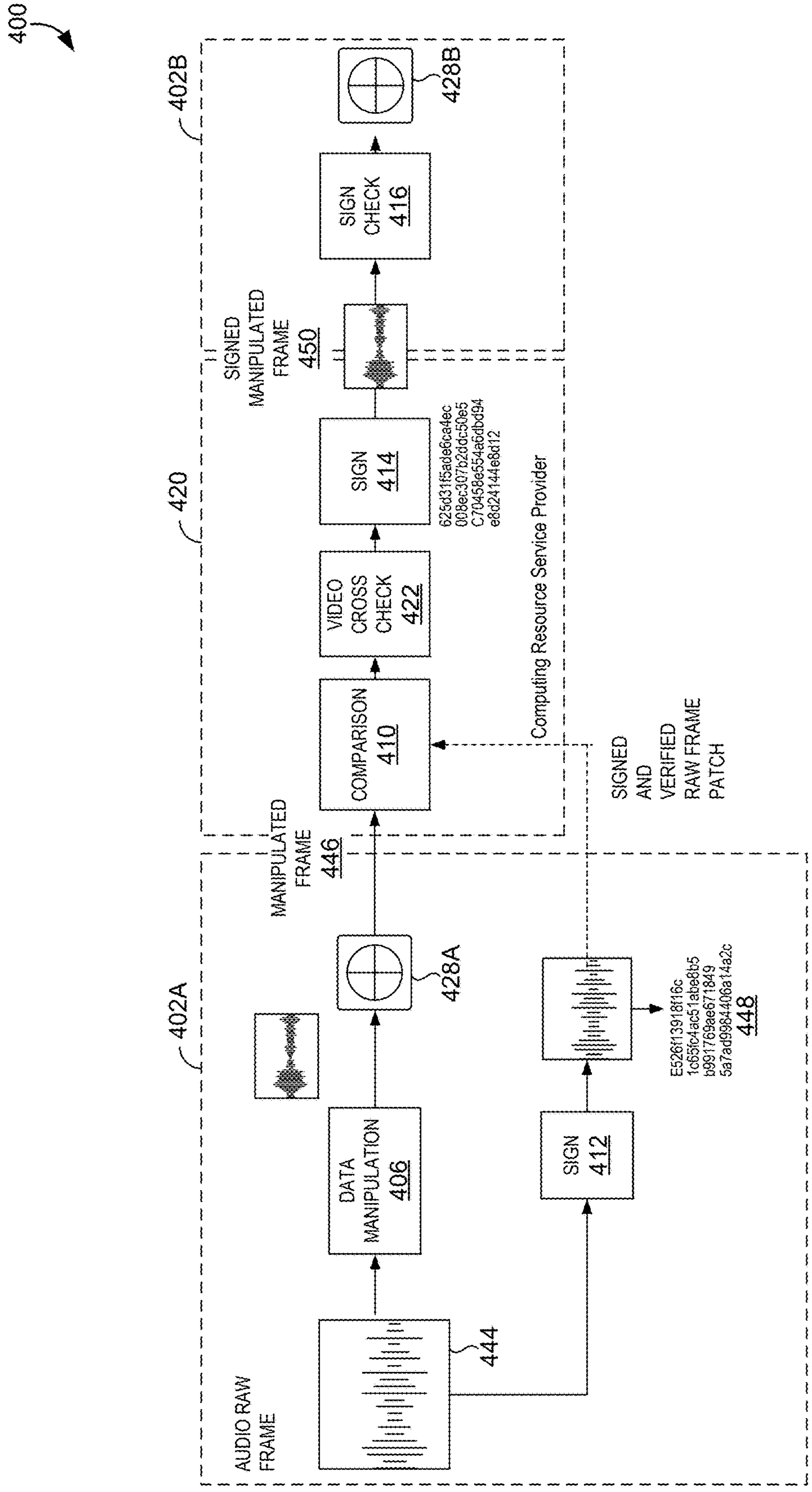
FIG. 4 is a block diagram of an example system for distributing content including signed audio frames, in accordance with an embodiment of the present disclosure.

FIG. 4 is a block diagram of an example environment 400, including a computing resource service provider 420 that compares signed and verified frames to manipulated frames 446 from a user device 402A prior to distribution to a user device 402B, in accordance with at least one embodiment. In one example, the user devices 402A and 402B are clients of a video conferencing application and/or service provided by the computing resource service provider 420. In an embodiment, the user device 402A includes a plurality of sensors that capture data from an environment of the user device 402A. In the example illustrated in FIG. 4, the user device 402A includes a microphone that captures audio as raw frames 444.

In various embodiments, the application 428A performs data manipulation 406 on the raw frames 444 to generate manipulated frames 446. For example, the application 428A performs echo cancelation, noise cancelation, or other audio processing to generate the manipulated frames. In various embodiments, the user device 402A obtains the raw frames and signs 412 the raw frames to generate a signature 448. In one example, a secure environment obtains the raw frames 444 (e.g., through a physical connection to the sensor, from an isolated memory area, or other secure method).

The signature 448, in various embodiments, is provided to the computing resource service provider 420. For example, the user device 402A transmits the raw frame 444 with the signature 448 (e.g., a signed hash of the raw frame 344). In addition, the computing resource service provider 420, in an embodiment, performs a comparison 410 of the manipulated frames 446 (e.g., provided by the application 428A) and the signed framed provided by the user device 402A. In one example, a machine learning algorithm is used to compare the manipulated frames 446 and the signed frames. In other embodiments, the cosine similarity and/or cross-correlation of the manipulated frames 446 and the signed frames is performed during comparison 410 in order to determine a match.

In addition, in an embodiment, the computing resource service provider 420 performs a video cross-check 422 based on corresponding video frames obtained from the user device 402A. For example, the user device 402A transmits video data, along with audio data (e.g., the raw frames 444 and manipulated frames 446, as illustrated in FIG. 4) to the computing resource service provider 420, which can be authenticated and verified, such as is described above in connection with FIG. 3. For example, the computing resource service provider 420 verifies that the user depicted in the video frames matches a user associated with the user device 402A in order to verify the audio (e.g., the manipulated frame 446).

In various embodiments, once comparison 410 and video cross-check 422 are completed successfully, the computing resource service provider 420 signs 414 the manipulated frame 446 to generate the signed manipulated frame 450. In various embodiments, once the signed manipulated frames 450 are obtained by the user device 402B, the user device 402B authenticates the signature 416 and, if authentication is successful, provides the signed manipulated frames 450 to the application 428B.

Figure 5:
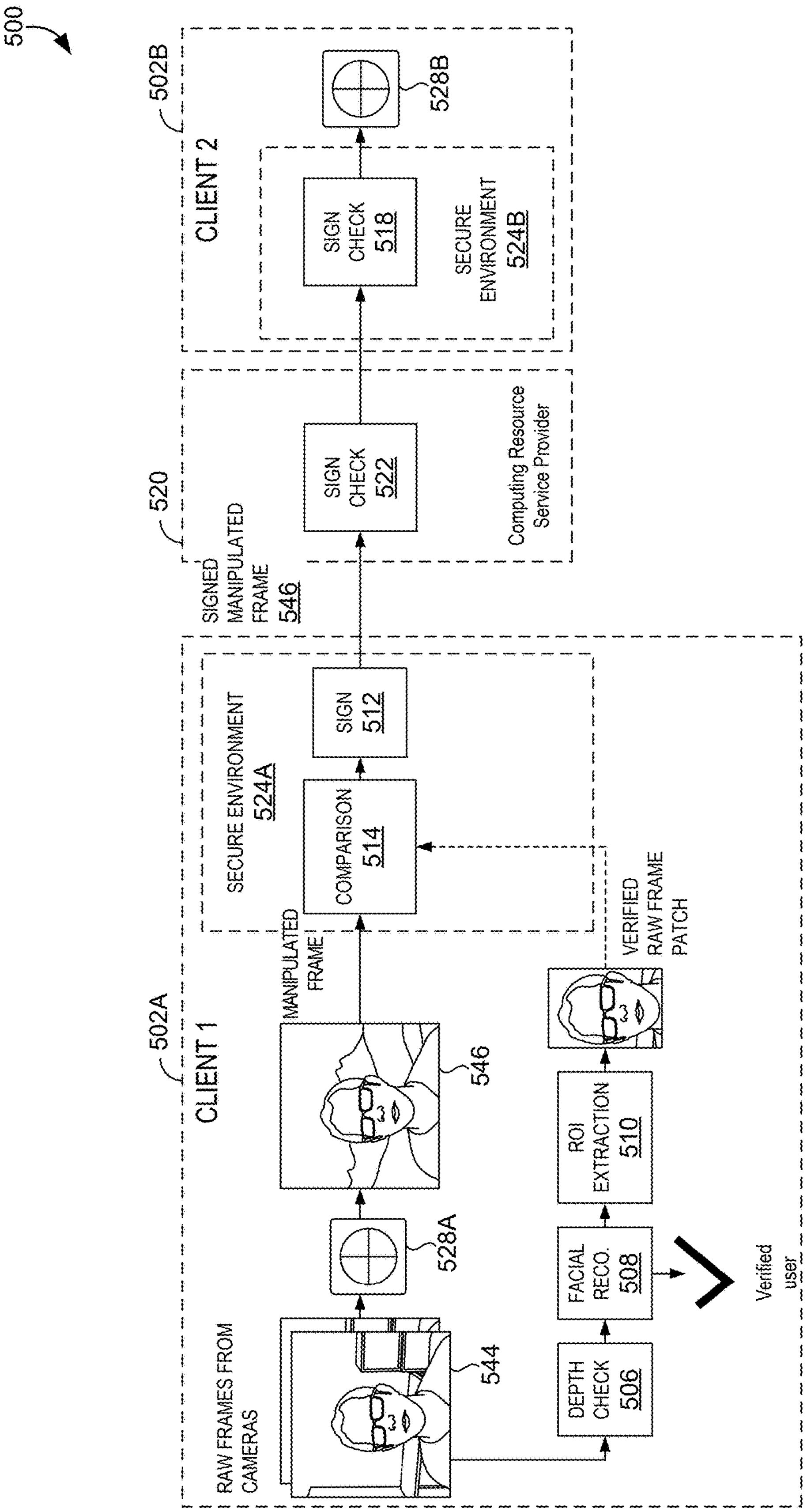
FIG. 5 is a block diagram of an example system for distributing content including signed video frames, in accordance with an embodiment of the present disclosure.

FIG. 5 is a block diagram of an example environment 500 including a computing resource service provider 520 that authenticates a signature associated with a signed manipulated frame 546 prior to distribution to a user device 502B in accordance with at least one embodiment. In one example, the user devices 502A and 502B are clients (e.g., client 1 and client 2) of a video conferencing application and/or service provided by the computing resource service provider 520. In an embodiment, the user device 502A performs operations as described above in the example illustrated in FIG. 3, and includes a plurality of sensors that capture audio, images, video, and/or other sensor data as raw frames 544.

In various embodiments, the user devices 502A and 502B include secure environments 524A and 524B to verify and sign the raw frames 344, manipulated frames, and/or digital signatures. For example, the secure environment 524A includes a direct rendering engine (DRE), which performs the video processing for the user device 502A. Continuing this example, the user device 502A performs a depth check 506, facial recognition 508, and ROI extraction 510 (e.g., as described above in connection with FIG. 3) and provides the verified raw frames 544 to the DRE, which performs the comparison of the manipulated frames and the verified raw frames. In such embodiments, verification of the content (e.g., manipulated audio and/or video frames generated by the application 528A) is performed by the user device 502A using the DRE as opposed to another device such as the computing resource service provider 520, as described above.

In the example illustrated in FIG. 5, the manipulated frame is then signed 512, and the signed manipulated frame 546 is transmitted to the computing resource service provider 520. In this manner, only the signed manipulated frame 546 is transmitted to the computing resource service provider 520, as the raw frames and/or other data generated by the sensors has already been verified by the secure environment 524A in accordance with an embodiment. For example, the computing resource service provider 520 authenticates 522 the signature prior to forwarding the content to the user device 502B for processing by the application 528B. However, in other embodiments, the computing resource service provider 520 forwards the content to the user device within authentication of the signature. Similarly, in various embodiments, the user device authenticates 518 the signature associated with the content. In other embodiments, this operation is omitted.

Figure 6:
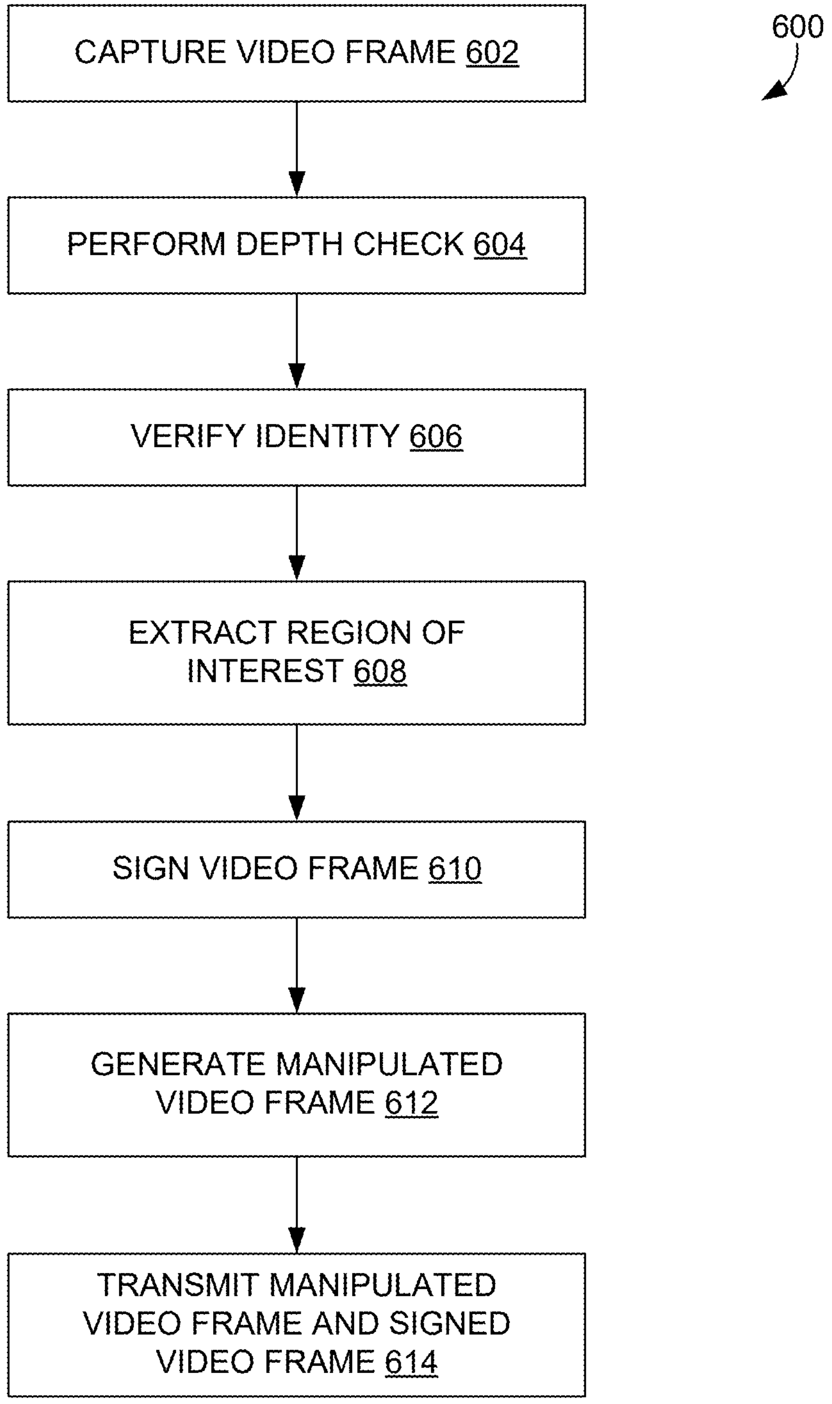
FIG. 6 is a flow diagram of distributing secure video content, in accordance with an embodiment of the present disclosure.

FIG. 6 is a flow diagram showing a method 600 for transmitting verified and authenticated content to a user device in accordance with at least one embodiment. The method 600 can be performed, for instance, by the user device 102A of FIG. 1. Furthermore, each block of the methods 600, 700, 800, 900, and 1000 or any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, the system implementing the method 600 obtains a video frame. As described above in connection with FIG. 1, in various embodiments, the video frame is generated by a sensor and provided to a secure environment for processing via a physical connection or isolated memory area. In one example, the video frame includes audio or other sensor data. At block 604, the system implementing the method 600 performs a depth check on the video frame. For example, the video frame includes infrared data that can be processed to determine if the environment depicted in the video frame is three-dimensional.

At block 606, the system implementing the method 600 verifies an identity. For example, a machine learning model (e.g., object recognition model) can verify an entity depicted in the video. In other examples, biometrics or other data are used to verify the identity of one or more entities depicted in the video. At block 608, the system implementing the method 600 extracts an ROI. For example, a machine learning model generates a bounding box around an ROI such as the verified entity depicted in the video.

At block 610, the system implementing the method 600 signs the video frame. For example, a hash is generated from a frame of the video, and a digital signature is generated using a cryptographic key or other signing material associated with the user device. At block 612, the system implementing the method 600 generates a manipulated video frame. For example, a video conferencing application injects a virtual background into the video frames to generate manipulated video frames. In another example, an application generates content by at least applying a filter or otherwise modifying the video frames.

At block 614, the system implementing the method 600 transmits the manipulated video frame and the signed video frame. For example, the secure environment, as described above, transmits the signed video frames after verifying the identity of the user, and the application then transmits the manipulated video frames.

Figure 7:
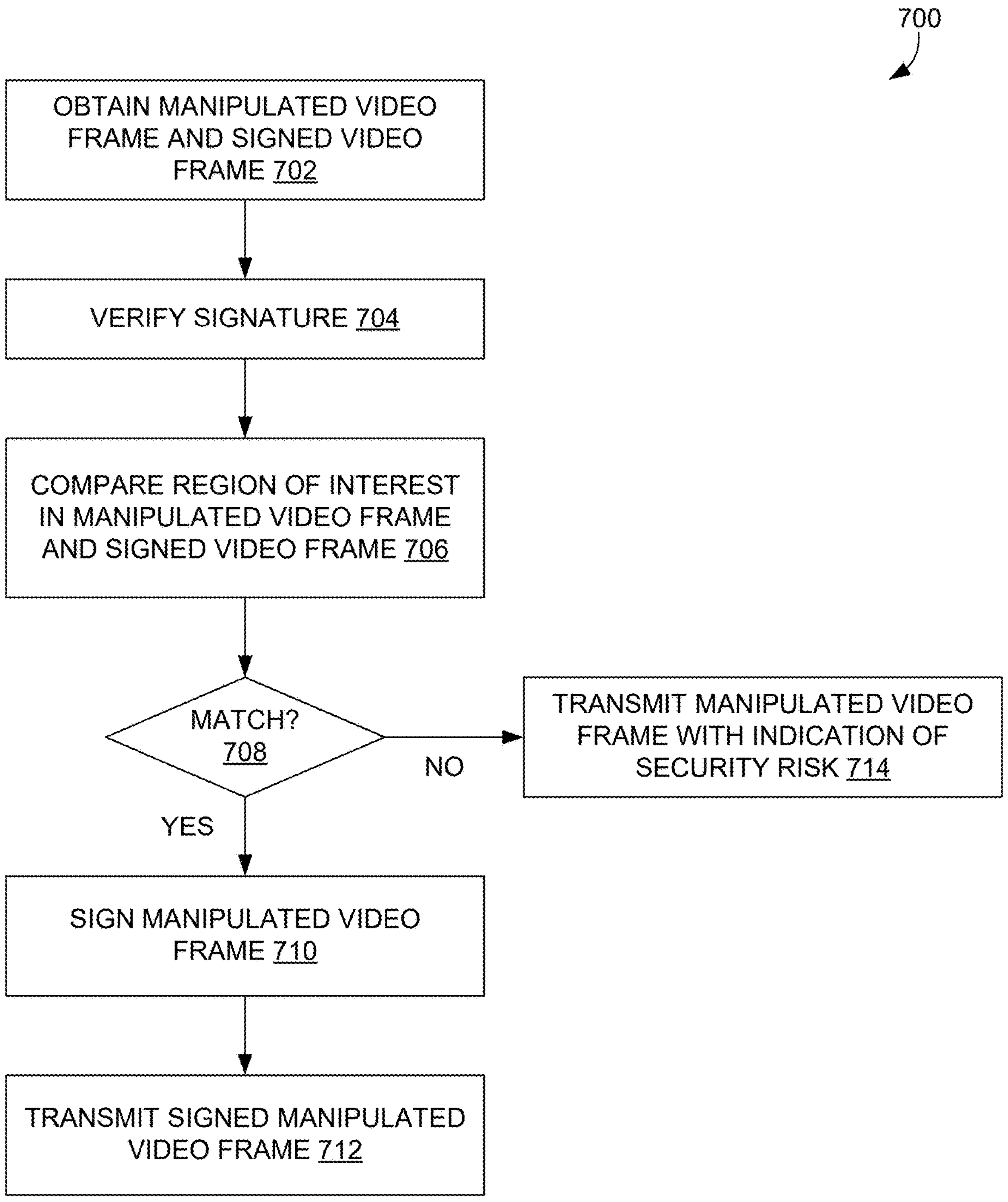
FIG. 7 is a flow diagram of authenticating secure video content, in accordance with an embodiment of the present disclosure.

FIG. 7 is a flow diagram showing a method 700 for distributing content in accordance with at least one embodiment. The method 700 can be performed, for instance, by the computing resource service provider 120 of FIG. 1. As shown at block 702, the system implementing the method 700 obtains the manipulated video frame and the signed video frame. In various embodiments, a video is obtained (e.g., from a sensor of a user device), and individual frames of the video (e.g., video frames) are extracted and/or processed. For example, the user device streams or otherwise transmits video to the computing resource service provider including signed frames and/or other data to enable the computing resource service provider to verify and/or authenticate the video.

At block 704, the system implementing the method 700 verifies the signature associated with the signed video frame. For example, the computing resource service provider decrypts the digital signature using a public key associated with the user device and verifies a hash of the video frame obtained from decrypting the digital signature. At block 706, the system implementing the method 700 compares the region of interest in the manipulated video frame and the signed video frame. For example, as described above, an object detection model takes the video frame as an input and outputs data associated with objects in the video frame (e.g., labels, confidence intervals, tags, names, type of information, etc.) and compares the output associated with the manipulated video frame and the signed video frame.

At block 708, the system implementing the method 700 determines if there is a match between the signed video frames and the manipulated data frames. For example, if the user identified in the signed video frame and the manipulated video frames is the same (e.g., as determined by the machine learning model), the system implementing the method 700 determines a match. If a match is determined, the system implementing the method 700 continues to block 710. At block 710, the system implementing the method 700 signs the manipulated video frames. For example, the computing resource service provider generates a hash of the manipulated video frame and encrypts the hash using a private key or other cryptographic material.

Returning to block 708, if a match is not determined, the system implementing the method 700 continues to block 714. At block 714, the system implementing the method 700 transmits the manipulated video frames with an indication of a security risk. For example, the computing resource service provider overlays an indication that the manipulated video frames could not be verified (e.g., the user does not match and/or signature verification failed). In another example, the computing resource service provider blocks the manipulated video frames or otherwise does not distribute unverified video frames.

At block 712, the system implementing the method 700 transmits the signed manipulated video frames. For example, the computing resource service provider distributes the content (e.g., manipulated video frames and digital signatures) as part of a service and/or application such as a video conferencing application, social media application, data collection application, messaging application, or other application that includes distributed content.

Figure 8:
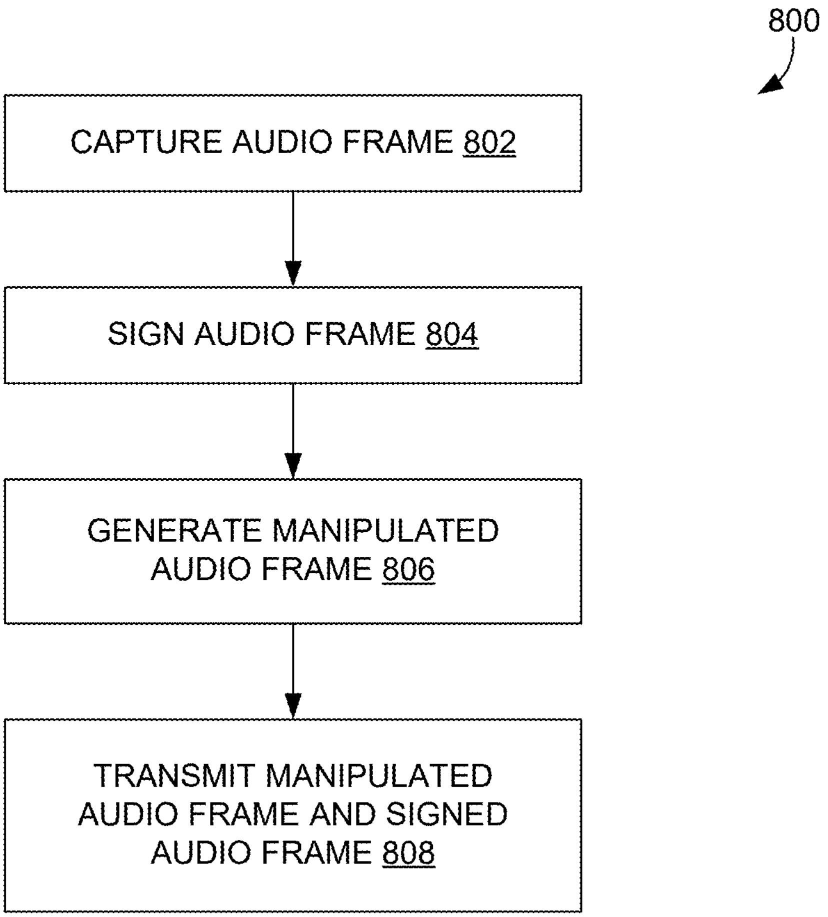
FIG. 8 is a flow diagram of distributing secure audio content, in accordance with an embodiment of the present disclosure.

FIG. 8 is a flow diagram showing a method 800 for transmitting content in accordance with at least one embodiment. The method 800 can be performed, for instance, by the user device 102A of FIG. 1. As shown at block 802, the system implementing the method 800 captures audio frames. For example, a microphone or other sensor of the user device captures sensor data from an environment. At block 804, the system implementing the method 800 signs the audio frame. For example, a secure environment of the user device signs the audio frame by at least generating a hash of the audio frame and generating a digital signature (e.g., encrypts) the hash of the audio frame.

At block 806, the system implementing the method 800 generates a manipulated audio frame. For example, an application executed by the user device modifies the audio frame to generate the manipulated audio frame such as noise reduction and/or echo cancelation. At block 808, the system implementing the method 800 transmits the manipulated audio frame and the signed audio frame. For example, the secure environment, as described above, transmits the signed audio frames, and the application transmits the manipulated audio frames.

Figure 9:
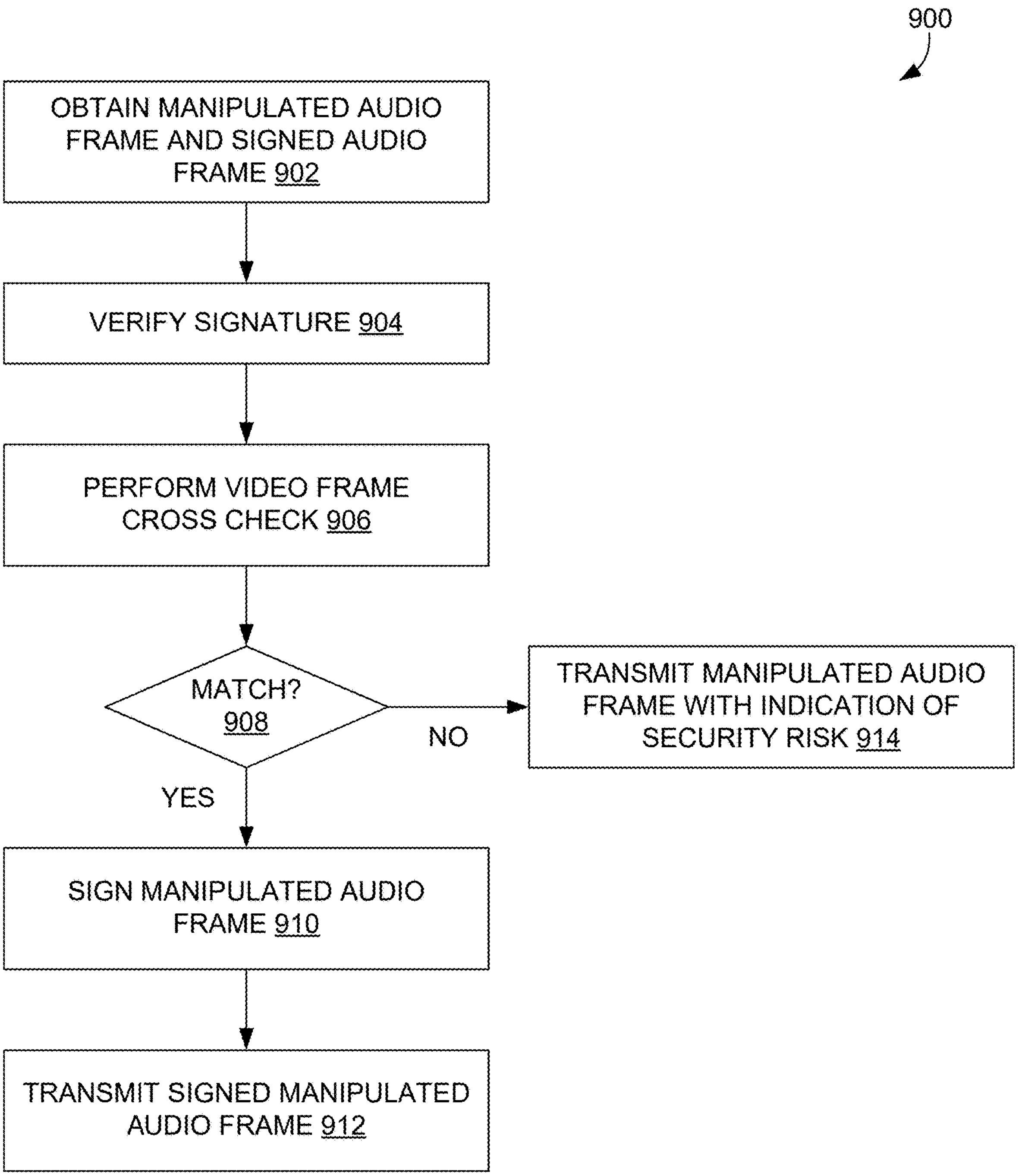
FIG. 9 is a flow diagram of authenticating secure audio content, in accordance with an embodiment of the present disclosure.

FIG. 9 is a flow diagram showing a method 900 for distributing content in accordance with at least one embodiment. The method 900 can be performed, for instance, by the computing resource service provider 120 of FIG. 1. As shown at block 902, the system implementing the method 900 obtains the manipulated audio frame and the signed audio frame. For example, the user device streams or otherwise transmits audio and corresponding video to the computing resource service provider, including signed frames and/or other data to enable the computing resource service provider to verify and/or authenticate the audio and/or video.

At block 904, the system implementing the method 900 verifies the signature associated with the signed audio frame. For example, the computing resource service provider decrypts the digital signature using a public key associated with the user device and verifies a hash of the audio frame obtained from decrypting the digital signature. At block 906, the system implementing the method 900 performs a video frame cross-check. For example, as described above, an entity depicted in the video is verified, and cross-checking includes determining if the entity has been successfully verified.

At block 908, the system implementing the method 900 determines if there is a match between the entities depicted in the signed video frames and the manipulated data frames. For example, if the user identified in the signed video frame and the manipulated video frames is the same (e.g., as determined by the machine learning model), the system implementing the method 900 determines a match. If a match is determined, the system implementing the method 900 continues to block 910. At block 910, the system implementing the method 900 signs the manipulated audio frames. For example, the computing resource service provider generates a hash of the manipulated audio frame and encrypts the hash using a private key or other cryptographic material.

Returning to block 908, if a match is not determined, the system implementing the method 900 continues to block 914. At block 914, the system implementing the method 900 transmits the manipulated audio frames with an indication of a security risk. For example, the computing resource service provider overlays an indication that the manipulated audio frames could not be verified (e.g., the user does not match and/or signature verification failed). In another example, the computing resource service provider blocks the manipulated audio frames or otherwise does not distribute unverified video frames.

At block 912, the system implementing the method 900 transmits the signed manipulated audio frames. For example, the computing resource service provider distributes the content (e.g., manipulated audio frames and digital signatures) as part of a service and/or application such as a video conferencing application, social media application, data collection application, messaging application, or other application that include distributed content.

Figure 10:
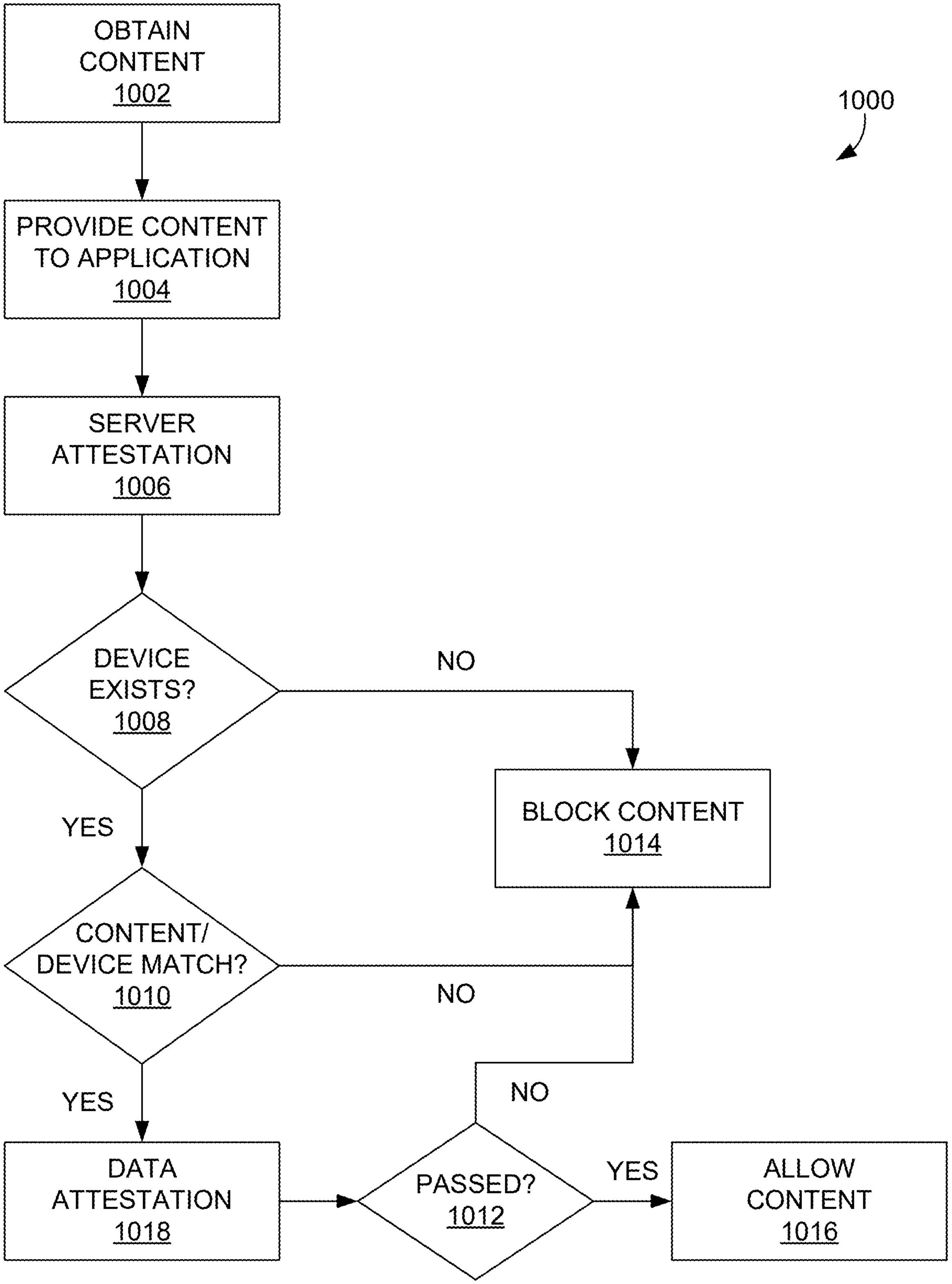
FIG. 10 is a flow diagram of distributing secure content, in accordance with an embodiment of the present disclosure.

FIG. 10 is a flow diagram showing a method 1000 for distributing and displaying content in accordance with at least one embodiment. The method 1000 can be performed, for instance, by the computing resource service provider 120 and/or user device 102B of FIG. 1. As shown at block 1002, the system implementing the method 1000 obtains content. For example, the user device obtains a video stream from a video conferencing application. In another example, the computing resource service provider obtains social media content generated by the user device. In various embodiments, the content includes audio and/or video that has been generated and/or modified by an application.

At block 1004, the system implementing the method 1000 provides content to the application. For example, a video conferencing application executed by the user device obtains the content for display to a user. At block 1006, the system implementing the method 1000 performs service attestation. For example, the user device obtains attestation data from the server distributing the content and establishes a trust relationship with the server (e.g., verification of cryptographic proof using a TPM or other secure hardware). At block 1008, the system implementing the method 1000 determines if the user device exists. For example, the server verifies that the user device is registered or otherwise authorized to distribute content. If the user device does not exist, the system implementing the method 1000 continues to block 1014 and blocks the content.

Returning to block 1008, if the device exists, the system implementing the method 1000 determines if the content and the device match at block 1010. For example, the user device verifies that a signature of the content matches cryptographic material assigned or otherwise associated with the user device generating the content. If content and user device do not match, the system implementing the method 1000 returns to block 1014 and blocks the content. However, if the content and user device match, the system continues to block 1018 and performs data attestation. For example, the content can be verified using the method 700 as described above in connection with FIG. 7. In various embodiments, other methods of data attestation can be used to verify the authenticity of the content and/or entities depicted in the content. At block 1012, the system implementing the method 1000 determines if data attestation passed (e.g., was completed successfully). For example, if data attestation fails, the system returns to block 1014 and blocks the content. However, if data assentation is successful, the system implementing the method 1000 continues to block 1016. At block 1016, the system implementing the method 1000 allows the content. For example, the application displays or otherwise streams the content.

Artifical Intelligence (AI) System Overview

An artificial intelligence (AI) system refers to an artificial intelligence computing environment or architecture that includes the infrastructure and components that support the development, training, and deployment of artificial intelligence models. It provides necessary hardware, software, and frameworks for developers to create and run artificial intelligence applications. An artificial intelligence system may be a cloud-based AI solution that leverages cloud computing infrastructure to develop, train, deploy, and manage AI models and applications. AI models may specifically refer to generative AI models that are designed to generate new data or content that is similar to, or in some cases, entirely different from data they are trained on.

Artificial intelligence systems can include transformer models that are capable of running complex neural language processing tasks. Transformer models—also known as Large Language Models (LLMs)—have applications in a wide range of industries. An LLM is a trained deep-learning model that can recognize, summarize, translate, predict, and generate content using very large datasets. LLMs and other types of generative AI models are associated with a training phase—where a model is taught to learn patterns, relationships, and knowledge from training datasets—and an inference phase, which includes making predictions, classifications, or generating outputs for real-world tasks or queries.

Unlike convolution neural networks, which are typically used for image tasks and mostly rely on convolution operations, transformer models are based on simple general matrix multiplication (GEMM) tasks, which can be further broken down to perform a dot product operation on two vectors. While CNN architectures are typically computationally heavy with a relatively small number of parameters, the architecture of transformer models results in the opposite: a very large number of parameters, with a fairly small number of operations. The LLM architecture can create challenges in that performance bottlenecks reside in the memory throughput and capacity rather than the compute engine.

Transformer models operate with memory accesses to retrieve a matrix of weights out of memory, together with a vector (either the input vector or partial result from a previous stage of the model), and multiplying the two. This is true for the model's attention sublayers, the FFN (feed-forward network), sublayers, and for the final embedding layer. As vector-matrix multiplication is actually comprised of numerous vector-vector multiplications (dot product), it is fair to say that most memory accesses are used to read two vectors in order to perform a dot product on them. As such, reading out the full vectors is inefficient.

As such, transformer models (also referred to herein as "generative AI models") require computational resources including processors and memory for the training phase and inference phase. The generative AI models operate with different types of processors (e.g., central processing units [CPUs] or graphics processing unit [GPUs]) in architectures that include multi-core CPUs or parallel processors including GPUs and tensor processing units (TPUs). Memory can be used to store model parameters and intermediate data for the training phase and the inference phase. Memory requirements may depend on the size and the architecture of the generative AI models. By way of illustration, an LLM can support an inferencing phase that includes using a trained model to make predictions, draw conclusions, or generate output based on input data or patterns learned during the model's training phase. During the inference phase, an LLM can use DRAM (Dynamic Random-Access Memory) to store various components and data for making inferences. LLMs can store their pre-trained model parameters (e.g., weights and biases of the neural network layers) in DRAM, and when a new input is provided for inference, the model accesses these parameters from DRAM to make predictions.

The inference phase can be divided into two stages: a prompt stage and an auto-regressive stage. The prompt stage can include receiving and processing input as a batch of new tokens as part of the same inference. The prompt stage may operate based on a Key-Value (KV) cache technique, where a KV cache is created for tokens in a batch. During the prompt stage, the input is being digested. The auto-regressive state can include using the model to generate the tokens one by one, based on previous tokens, relying on reading the KV cache of previously processed tokens, and adding the data of the new of only new tokens to the KV cache. This auto-regressive stage includes the model generating a response to the input from the prompt stage.

Example Computing Environments

Figure 11:
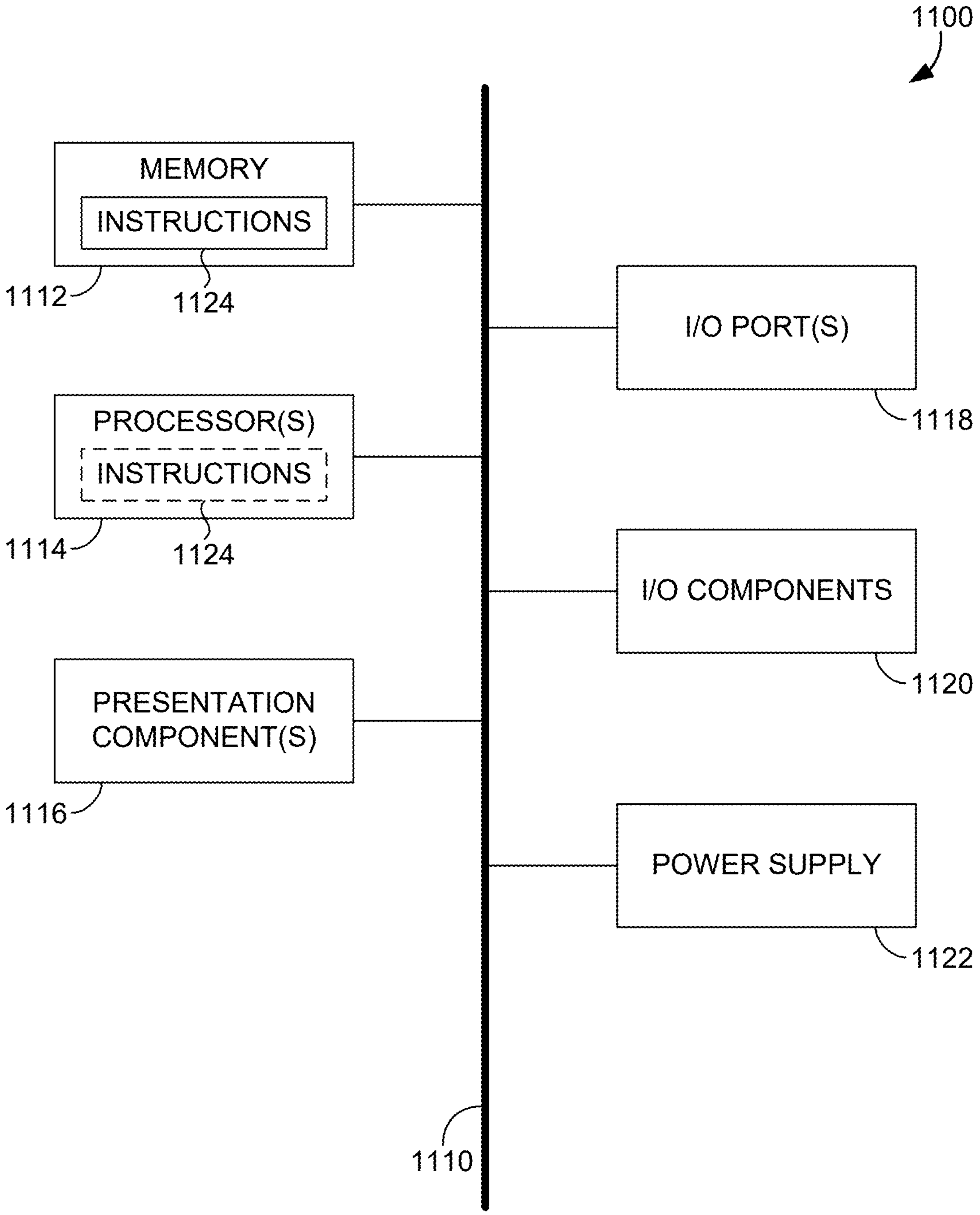
FIG. 11 is a block diagram of an example computing environment suitable for use in implementing an embodiment of the present disclosure.
Figure 12:
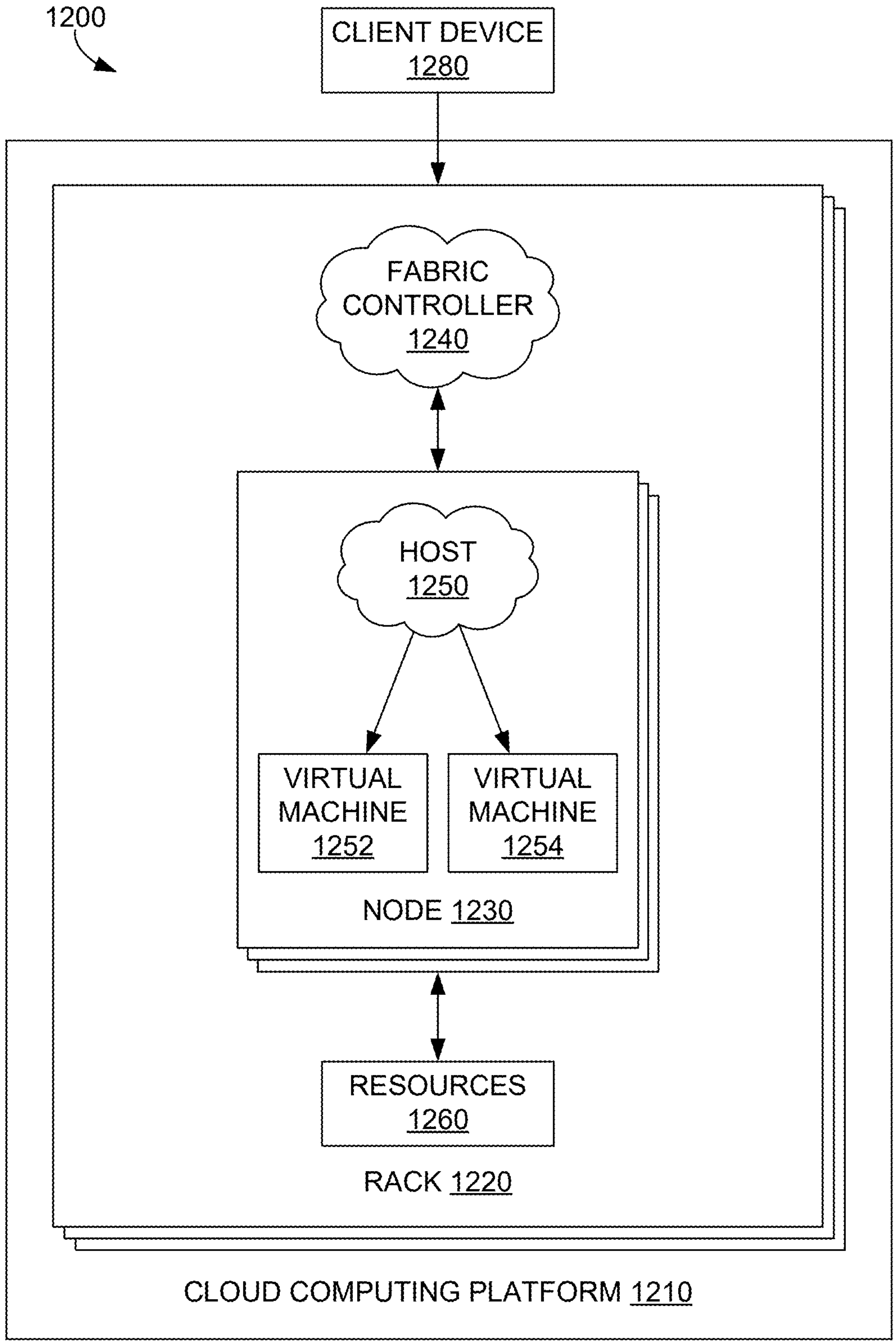
FIG. 12 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 11 and 12, respectively.

With reference to FIG. 11, an example computing device is provided and referred to generally as computing device 1100. The computing device 1100 is but one example of a suitable computing environment and is not intended to suggest any limitation as to the scope of use or functionality of embodiments of the disclosure, and nor should the computing device 1100 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media, including memory storage devices.

Some embodiments comprise an end-to-end software-based system that operates within system components described herein to operate computer hardware to provide system functionality. At a low level, hardware processors generally execute instructions selected from a machine language (also referred to as machine code or native) instruction set for a given processor. The processor recognizes the native instructions and performs corresponding low-level functions related to, for example, logic, control, and memory operations. Low-level software written in machine code can provide more complex functionality to higher level software. Accordingly, in some embodiments, computer-executable instructions include any software, including low-level software written in machine code, higher level software such as application software, and any combination thereof. In this regard, the system components can manage resources and provide services for system functionality. Any other variations and combinations thereof are contemplated within the embodiments of the present disclosure.

With reference to FIG. 11, computing device 1100 includes a bus 1110 that directly or indirectly couples the following devices: memory 1112, one or more processors 1114, one or more presentation components 1116, one or more input/output (I/O) ports 1118, one or more I/O components 1120, and an illustrative power supply 1122. In one example, bus 1110 represents one or more buses (such as an address bus, data bus, or combination thereof). Although the various blocks of FIG. 11 are shown with lines for the sake of clarity, in reality, these blocks represent logical, not necessarily actual, components. For example, a presentation component includes a display device, such as an I/O component. Also, processors have memory. The inventors hereof recognize that such is the nature of the art and reiterate that the diagram of FIG. 11 is merely illustrative of an example computing device that can be used in connection with one or more embodiments of the present disclosure. Distinction is not made between such categories as "workstation," "server," "laptop," or "handheld device," as all are contemplated within the scope of FIG. 11 and with reference to "computing device."

Computing device 1100 typically includes a variety of computer-readable media. Computer-readable media can be any available media that can be accessed by computing device 1100 and includes both volatile and non-volatile, removable and non-removable media. By way of example, and not limitation, computer-readable media comprises computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 1100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 1112 includes computer storage media in the form of volatile and/or non-volatile memory. In one example, the memory is removable, non-removable, or a combination thereof. Hardware devices include, for example, solid-state memory, hard drives, and optical-disc drives. Computing device 1100 includes one or more processors 1114 that read data from various entities such as memory 1112 or I/O components 1120. As used herein and in one example, the term processor or "a processer" refers to more than one computer processor. For example, the term processor (or "a processor") refers to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, a cloud computing system, or parallel processing by more than a single processor. Further, various operations described herein as being executed or performed by a processor are performed by more than one processor.

Presentation component(s) 1116 presents data indications to a user or other device. Presentation components include, for example, a display device, speaker, printing component, vibrating component, and the like.

The I/O ports 1118 allow computing device 1100 to be logically coupled to other devices, including I/O components 1120, some of which are built-in. Illustrative components include a microphone, joystick, game pad, satellite dish, scanner, printer, or a wireless device. The I/O components 1120 can provide a natural user interface (NUI) that processes air gestures, voice, or other physiological inputs generated by a user. In some instances, inputs are transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. In one example, the computing device 1100 is equipped with depth cameras, such as stereoscopic camera systems, infrared camera systems, red-green-blue (RGB) camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

Some embodiments of computing device 1100 include one or more radio(s) 1124 (or similar wireless communication components). The radio transmits and receives radio or wireless communications. Example computing device 1100 is a wireless terminal adapted to receive communications and media over various wireless networks. Computing device 1100 may communicate via wireless protocols, such as code-division multiple access ("CDMA"), Global System for Mobile ("GSM") communication, or time-division multiple access ("TDMA"), as well as others, to communicate with other devices. In one embodiment, the radio communication is a short-range connection, a long-range connection, or a combination of both a short-range and a long-range wireless telecommunications connection. In various embodiments, references to "short" and "long" types of connections do not refer to the spatial relation between two devices. Instead, in general, references to short range and long range indicate different categories, or types, of connections (for example, a primary connection and a secondary connection). A short-range connection includes, by way of example and not limitation, a Wi-Fi® connection to a device (for example, mobile hotspot) that provides access to a wireless communications network, such as a wireless local area network (WLAN) connection using the 802.11 protocol; a Bluetooth® connection to another computing device is a second example of a short-range connection, or a near-field communication connection. A long-range connection may include a connection using, by way of example and not limitation, one or more of Code-Division Multiple Access (CDMA), General Packet Radio Service (GPRS), Global System for Mobile Communication (GSM), Time-Division Multiple Access (TDMA), and 802.16 protocols.

Referring now to FIG. 12, an example distributed computing environment 1200 is illustratively provided, in which implementations of the present disclosure can be employed. In particular, FIG. 12 shows a high-level architecture of an example cloud computing platform 1210 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 1200 that includes cloud computing platform 1210, rack 1220, and node 1230 (for example, computing devices, processing units, or blades) in rack 1220. The technical solution environment can be implemented with cloud computing platform 1210, which runs cloud services across different data centers and geographic regions. Cloud computing platform 1210 can implement the fabric controller 1240 component for provisioning and managing resource allocation, deployment, upgrade, and management of cloud services. Typically, cloud computing platform 1210 acts to store data or run service applications in a distributed manner. Cloud computing platform 1210 in a data center can be configured to host and support operation of endpoints of a particular service application. In one example, the cloud computing platform 1210 is a public cloud, a private cloud, or a dedicated cloud.

Node 1230 can be provisioned with host 1250 (for example, operating system or runtime environment) running a defined software stack on node 1230. Node 1230 can also be configured to perform specialized functionality (for example, computer nodes or storage nodes) within cloud computing platform 1210. Node 1230 is allocated to run one or more portions of a service application of a tenant. A tenant can refer to a customer utilizing resources of cloud computing platform 1210. Service application components of cloud computing platform 1210 that support a particular tenant can be referred to as a multitenant infrastructure or tenancy. The terms "service application," "application," or "service" are used interchangeably with regards to FIG. 12, and broadly refer to any software, or portions of software, that run on top of, or access storage and computing device locations within, a datacenter.

When more than one separate service application are being supported by nodes 1230, certain nodes 1230 are partitioned into virtual machines (for example, virtual machine 1252 and virtual machine 1254). Physical machines can also concurrently run separate service applications. The virtual machines or physical machines can be configured as individualized computing environments that are supported by resources 1260 (for example, hardware resources and software resources) in cloud computing platform 1210. It is contemplated that resources can be configured for specific service applications. Further, each service application may be divided into functional portions such that each functional portion is able to run on a separate virtual machine. In cloud computing platform 1210, multiple servers may be used to run service applications and perform data storage operations in a cluster. In one embodiment, the servers perform data operations independently but exposed as a single device, referred to as a cluster. Each server in the cluster can be implemented as a node.

In some embodiments, client device 1280 is linked to a service application in cloud computing platform 1210. Client device 1280 may be any type of computing device, such as user device 102 described with reference to FIG. 1, and the client device 1280 can be configured to issue commands to cloud computing platform 1210. In embodiments, client device 1280 communicates with service applications through a virtual Internet Protocol (IP) and load balancer or other means that direct communication requests to designated endpoints in cloud computing platform 1210. Certain components of cloud computing platform 1210 communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving" or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, the term "set" may be employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where N is any positive integer. That is, a set may include 1, 2, 3, . . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers $\mathbb{N}$). The objects included in other sets may be continuous objects (for example, the set of real numbers $\mathbb{R}$). In some embodiments, "a set of objects" that is not a null set of the objects may be interchangeably referred to as either "one or more objects" or "at least one object," where the term "object" may stand for any object or element that may be included in a set. Accordingly, the phrases "one or more objects" and "at least one object" may be employed interchangeably to refer to a set of objects that is not the null or empty set of objects. A set of objects that includes at least two of the objects may be referred to as "a plurality of objects."

As used herein and in one example, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present disclosure are described with reference to a computing device or a distributed computing environment; however, the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather, various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A system comprising: a memory component; and
a processing device coupled to the memory component, the processing device being implemented by one or more processors to perform operations comprising:
obtaining a signed video frame and a manipulated video frame, wherein the signed video frame is generated within a secure environment of a user device;
authenticating a first digital signature associated with the signed video frame;
causing a first machine learning model to compare a first region of interest in the signed video frame and a second region of interest in the manipulated video frame to determine that an entity depicted in the signed video frame and the manipulated video frame match;
generating, based on determining that the entity depicted in the signed video frame and the manipulated video frame match, a second digital signature for the manipulated video frame; and
transmitting, to an application executed by a second user device, the second digital signature and the manipulated video frame.

2. The system of claim 1, wherein causing the first machine learning model to compare the first region of interest and the second region of interest further includes determining a first user depicted in the signed video frame matches a second user depicted in the manipulated video frame.

3. The system of claim 2, wherein the first machine learning model includes an object detection model.

4. The system of claim 2, wherein the processing device further performs operations:
obtaining a signed audio frame and a manipulated audio frame;
authenticating the signed audio frame;
in response to determining that the first user depicted in the signed video frame matches the second user depicted in the manipulated video frame, generating a signed manipulated audio frame based on the manipulated audio frame; and
transmitting the signed manipulated audio frame.

5. The system of claim 1, wherein the processing device further performs operations providing an indication that the manipulated video frame is unverified.

6. The system of claim 5, wherein providing the indication that the manipulated video frame is unverified is performed as a result of authentication of the first digital signature failing.

7. The system of claim 5, wherein providing the indication that the manipulated video frame is unverified is performed as a result of the first machine learning model indicating that the entity depicted in the signed video frame and the manipulated video frame do not match.

8. The system of claim 1, wherein the secure environment is provided by a secure processor of the user device.

9. A non-transitory computer-readable medium storing executable instructions that, when executed by one or more processors of a computing system, cause the computing system to perform operations comprising:

obtaining first media content associated with a first digital signature and second media content generated based on the first media content;

authenticating the first digital signature to verify integrity of the first media content;

causing a machine learning model to compare one or more features associated with an entity depicted in the first media content to one or more corresponding features associated with an entity depicted in the second media content to determine whether the entity depicted in the first media content matches the entity depicted in the second media content;

in response to determining that the entity depicted in the first media content matches the entity depicted in the second media content, generating a second digital signature for the second media content; and transmitting, to a video conferencing application executed by one or more recipient devices, the second digital signature and the second media content.

10. The non-transitory computer-readable medium of claim 9, wherein the second digital signature indicates that the second media content has been verified.

11. The non-transitory computer-readable medium of claim 9, wherein the first digital signature is generated in a secure environment containing a cryptographic key used to generate the first digital signature.

12. The non-transitory computer-readable medium of claim 9, wherein the medium further stores executable instructions that, when executed by the one or more processors, cause the computing system to perform operations:

obtaining third media content associated with a third digital signature and fourth media content generated based on the third media content; and blocking transmission of the fourth media content as a result of authentication of the third digital signature failing.

13. The non-transitory computer-readable medium of claim 9, wherein the medium further stores executable instructions that, when executed by the one or more processors, cause the computing system to perform operations:

obtaining third media content associated with a third digital signature and fourth media content generated based on the third media content; and blocking transmission of the fourth media content as a result of determining that an entity depicted in the third media content does not match an entity depicted in the fourth media content.

14. The non-transitory computer-readable medium of claim 9, wherein causing the machine learning model to compare the one or more features associated with the entity depicted in the first media content to the one or more corresponding features associated with the entity depicted in the second media content further comprises causing the machine learning model to compare a region of interest included in the first media content and a corresponding region of interest included in the second media content.

15. The non-transitory computer-readable medium of claim 9, wherein the machine learning model is an object detection model.

16. A method comprising:

obtaining first media content associated with a first digital signature and second media content that is a modified based on a portion of the first media content;

authenticating the first digital signature to verify the first media content;

obtaining from a machine learning model, based on an input including the first media content and the second media content, a determination indicating whether an entity depicted in the first media content matches an entity depicted in the second media content, where the machine learning model generates the determination by at least comparing a region of interest or feature representation associated with the entity in the first media content and a corresponding region of interest or feature representation associated with the entity in the second media content;

generating, based on the determination, a second digital signature for the second media content; and providing, to an application executed by one or more recipient devices, the second media content and the second digital signature for the second media content.

17. The method of claim 16, wherein the method further comprises comparing, using a second machine learning model, one or more additional features associated with the entity depicted in the first media content to one or more corresponding additional features associated with the entity depicted in the second media content.

18. The method of claim 16, wherein authenticating the first digital signature comprises verifying integrity of the first media content based on sensor data captured by a sensor of a user device.

19. The method of claim 16, wherein obtaining from the machine learning model the determination indicating whether the entity depicted in the first media content matches the entity depicted in the second media content comprises performing facial recognition of the entity.

20. The method of claim 16, wherein the application is a video conferencing application.

* * * * *